(12) United States Patent
Wang et al.

(10) Patent No.: US 12,481,040 B2
(45) Date of Patent: Nov. 25, 2025

(54) LOW POWER LiDAR SYSTEM WITH SMART LASER INTERROGRATION

(71) Applicant: Samsung Electronics Co., Ltd., Suwon-si (KR)

(72) Inventors: Yibing Michelle Wang, Temple City, CA (US); Chunji Wang, Los Angeles, CA (US); Kwang Oh Kim, Cerritos, CA (US); Hongyu Wang, San Gabriel, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 1150 days.

(21) Appl. No.: 17/393,394

(22) Filed: Aug. 3, 2021

(65) Prior Publication Data
US 2022/0308189 A1    Sep. 29, 2022

Related U.S. Application Data

(60) Provisional application No. 63/165,722, filed on Mar. 24, 2021.

(51) Int. Cl.
*G01S 7/4865* (2020.01)
*G01S 7/4914* (2020.01)
(Continued)

(52) U.S. Cl.
CPC .......... *G01S 7/4865* (2013.01); *G01S 7/4914* (2013.01); *G01S 17/10* (2013.01); *G04F 10/005* (2013.01)

(58) Field of Classification Search
CPC ......... G04F 10/005; G06T 2207/10028; G01S 7/4863
See application file for complete search history.

(56) References Cited

U.S. PATENT DOCUMENTS 9,417,326 B2   8/2016  Niclass et al.
10,317,529 B2  6/2019  Shu et al.
(Continued)

FOREIGN PATENT DOCUMENTS

WO    2020223589 A1    11/2020

OTHER PUBLICATIONS

European Extended Search Report for Application No. 21217963.4, mailed Jun. 30, 2022.
(Continued)

*Primary Examiner* — Robert W Hodge
*Assistant Examiner* — Clara G Chilton
(74) *Attorney, Agent, or Firm* — Renaissance IP Law Group LLP (57) ABSTRACT

A direct time-of-flight (DTOF) LiDAR system includes a sensor array, a first gated time-to digital converter (TDC) circuit and second TDC circuit. The sensor array includes pixels arranged to detect a first disparity location on the sensor array of a reflection signal received from a first object at a first range with respect to a second disparity location on the sensor array of a reflection signal received from a second object at a second range that is greater than the first range. The first TDC circuit generates first timestamp information relating to detection of the first reflection signal in which the first gated TDC circuit is gated based on the first disparity location. The second gated TDC circuit generates second timestamp information relating to detection of the second reflection signal in which the second gated TDC circuit is gated based on the second disparity location.

20 Claims, 9 Drawing Sheets

(51) Int. Cl.
  *G01S 17/10* (2020.01)
  *G04F 10/00* (2006.01)

(56) References Cited

U.S. PATENT DOCUMENTS

| | | | |
|---|---|---|---|
| 10,884,126 | B2 | 1/2021 | Shu et al. |
| 2018/0209846 | A1* | 7/2018 | Mandai .................. G01S 17/08 |
| 2019/0018117 | A1 | 1/2019 | Perenzoni et al. |
| 2019/0230304 | A1* | 7/2019 | Moore .................... G01S 17/10 |
| 2019/0250257 | A1* | 8/2019 | Finkelstein .......... H04N 25/773 |
| 2019/0326347 | A1 | 10/2019 | Bulteel |
| 2020/0116838 | A1 | 4/2020 | Erdogan et al. |
| 2020/0158836 | A1 | 5/2020 | Henderson et al. |
| 2020/0233068 | A1 | 7/2020 | Henderson et al. |
| 2020/0284883 | A1 | 9/2020 | Ferreira et al. |
| 2020/0348416 | A1 | 11/2020 | Sakaguchi et al. |

OTHER PUBLICATIONS

Oh, Min Seok et al., "Development and Analysis of a Photon-Counting Three-Dimensional Imaging Laser Detection and Ranging (LADAR) System," Journal of the Optical Society of America A, vol. 28, No. 5, 2011, pp. 759-765.

Portaluppi, Davide et al., "32×32 CMOS SPAD Imager for Gated-Imaging, Photon-Timing, and Photon-Coincidence," IEEE Journal of Selected Topics in Quantum Electronics, vol. 24, No. 2, 2017, 6 pages.

* cited by examiner

LOW POWER LiDAR SYSTEM WITH SMART LASER INTERROGRATION

CROSS-REFERENCE TO RELATED APPLICATION

This application claims the priority benefit under 35 U.S.C. § 119(e) of U.S. Provisional Application No. 63/165,722, filed on Mar. 24, 2021, the disclosure of which is incorporated herein by reference in its entirety.

TECHNICAL FIELD

The subject matter disclosed herein relates to Light Detection and Ranging (LiDAR) systems. More particularly, the subject matter disclosed here relates to a Direct Time-of-Flight (DTOF) LiDAR system that includes disparity-based pixel grouping, and use a disparity-gated Time-to-Digital Conversion (TDC) circuit.

BACKGROUND

DTOF-based LiDAR systems measure distance of an object by sending multiple short laser pulses toward that object (interrogation) and measuring the TOF of the returned pulses. Single Photo Avalanche Diode (SPAD) pixels in a DTOF sensor capture impinging photons and generate digital time codes representing TOF information of a photon. The photons that are captured may come from ambient light or active laser illumination. A histogram may be formed using the digital time codes captured over hundreds or thousands of repetitions. When ambient light is strong, the albedo of an object is low, and/or when the distance of the object is long, many laser cycles may be needed to form a reliable histogram.

The SPAD pixels in a traditional DTOF-based LiDAR system generate a large amount of data, and a large memory or a large counter depth on a chip may be needed to form full histograms for a traditional DTOF-based LiDAR system. To achieve high accuracy, traditional DTOF-based LiDAR systems usually use a two-pass solution. The first pass is used to form a histogram having a coarse bin size and covering a large range to find an approximate range of an object or objects in a field of view (FOV). A second pass is then used to make a higher accuracy measurements by forming a fine histogram bin having a narrowed range around the coarse measurement. The number of laser pulses used for the first and second passes are usually similar, which means that about 50% of the optical power may be wasted. Another traditional approach is to use low-power laser pulses to scan an entire scene, and then increase the laser power to scan areas having no return pulses. This approach also requires two passes, which also increases optical power.

SUMMARY

An example embodiment provides a time-of-flight sensor that may include a sensor array, a first gated time-to-digital converter and a second gated time-to-digital converter. The sensor array may include a plurality of pixels arranged to detect a first disparity location on the sensor array of a first reflection signal received from a first object with respect to a second disparity location on the sensor array of a second reflection signal received from a second object in which the first object may be at a first range from the sensor array, the second object may be at a second range from the sensor array, and the second range may be greater than the first range. The first gated time-to-digital converter circuit may be configured to generate first timestamp information relating to detection of the first reflection signal in which the first gated time-to-digital converter circuit may be gated to generate the first timestamp information based on the first disparity location. The second time-to-digital converter circuit may be configured to generate second timestamp information relating to detection of the second reflection signal in which the second gated time-to-digital converter circuit may be gated to generate the second timestamp information based on the second disparity location. In one embodiment, the first gated time-to-digital converter circuit may be clocked at a first clock rate that may include a first period and the second gated time-to-digital converter circuit may be clocked at a second clock rate that may include a second period in which the first period may be shorter than the second period. In another embodiment, the plurality of pixels of the sensor array may be further arranged to detect a third disparity location on the sensor array of a third reflection signal received from a third object with respect to the second disparity location on the sensor array of the second reflection signal in which the third object may be at a third range from the sensor array that is greater than the first range and that is less than the second range. The time-of-flight sensor may further include a third gated time-to-digital converter circuit that may be configured to generate third timestamp information relating to detection of the third reflection signal in which the third gated time-to-digital converter circuit may be gated to generate the third timestamp information based on the third disparity location. In still another embodiment, the third gated time-to-digital converter circuit may be clocked at a third clock rate that may include a third period that is longer than the first period and shorter than the second period. Yet another embodiment may include a histogram circuit that generates a histogram that may include bins that correspond to the first and second disparity locations. One embodiment may include a histogram circuit in which an average ambient light level is subtracted from each bin of a histogram generated by the histogram circuit. Another embodiment may include a histogram circuit that may be coupled to the first time-to-digital converter circuit and the second time-to-digital converter circuit, and the histogram circuit may generate a histogram based on first and second timestamp information in which a detection event may be added to a number of bins that correspond to a pulse width of a transmitted pulse that may be detected as a reflection signal by the sensor array.

An example embodiment provides a time-of-flight sensor may include a sensor array, a selector circuit, and a gated time-to-digital converter circuit. The sensor array may include a first group of pixels that detect a first disparity location on the sensor array of a first reflection signal received from a first object and a second group of pixels that detect a second disparity location on the sensor array of a second reflection signal received from a second object in which the first object may be at a first range from the sensor array, and the second object may be at a second range from the sensor array that is greater than the first range. The selector circuit may be coupled to the sensor array and may output a first output of the first group of pixels and a first clock signal corresponding to the first disparity location based on an intensity of the first group of pixels may be greater than an intensity of the second group of pixels, and may output a second output of the second group of pixels and a second clock signal corresponding to the second disparity location based on the intensity of the second group of pixels being greater than the intensity of the second group of pixels. The gated time-to-digital converter circuit may be coupled to the output of the selector circuit, and may be configured to generate first timestamp information for the first output of the first group of pixels using the first clock signal based on the selector circuit outputting the first output of the first group of pixels and the first clock signal, and may be configured to generate second timestamp information for the second output of the second group of pixels using the second clock signal based on the selector circuit outputting the second output of the second group of pixels and the second clock signal. In one embodiment, the first clock signal may be a first clock period and the second clock signal may be a second clock period that is longer than the first clock period. In another embodiment, the sensor array may further include third group of pixels that detect a third disparity location on the sensor array of a third reflection signal received from a third object in which the third object may be at a third range from the sensor array that is greater than the first range and less than the second range, in which the selector circuit may further output a third output of the third group of pixels and a third clock signal corresponding to the third disparity location based on an intensity of the third group of pixels being greater than the intensity of the first group of pixels and the intensity of the second group of pixels, and in which the gated time-to-digital converter circuit may further be configured to generate timestamp information for the third output of the third group of pixels using the third clock signal based on the selector circuit outputting the third output of the third group of pixels and the third clock signal. In still another embodiment, the third clock signal may include a third clock period that is longer than the first clock period and shorter than the second clock period. In yet another embodiment, the time-of-flight sensor may further include a histogram circuit that generates a histogram comprising bins that correspond to the first and second disparity locations. In one embodiment, the time-of-flight sensor may further include a histogram circuit in which an average ambient light level is subtracted from each bin of a histogram generated by the histogram circuit. In another embodiment, the time-of-flight sensor may further include a histogram circuit that may be coupled to the gated time-to-digital converter circuit in which the histogram circuit may generate a histogram based on first and second timestamp information and in which a detection event may be added to a number of bins that correspond to a pulse width of a transmitted pulse that is detected as a reflection signal by the sensor array.

An example embodiment provides a time-of-flight sensor that may include a sensor array, a first gated time-to-digital converter circuit, a second gated time-to-digital converter circuit and a histogram circuit. The sensor array may include a plurality of pixels arranged to detect a first disparity location on the sensor array of a first reflection signal received from a first object with respect to a second disparity location on the sensor array of a second reflection signal received from a second object in which the first object may be at a first range from the sensor array, the second object may be at a second range from the sensor array, and the second range may be greater than the first range. The first gated time-to-digital converter circuit may be configured to generate first timestamp information relating to detection of the first reflection signal in which the first gated time-to-digital converter circuit may be gated to generate the first timestamp information based on the first disparity location. The second gated time-to-digital converter circuit may be configured to generate second timestamp information relating to detection of the second reflection signal in which the second gated TDC circuit may be gated to generate the second timestamp information based on the second disparity location. The histogram circuit may be coupled to the first time-to-digital converter circuit and the second TDC circuit, the histogram circuit generating a histogram based on first and second timestamp information and in which a detection event is added to a number of bins that correspond to a pulse width of a transmitted pulse that is detected as a reflection signal by the sensor array. In one embodiment, the first gated TDC circuit may be clocked at a first clock rate that may include a first period and the second gated TDC circuit may be clocked at a second clock rate that may include a second period in which the first period may be shorter than the second period. In another embodiment, the plurality of pixels of the sensor array may further be arranged to detect a third disparity location on the sensor array of a third reflection signal received from a third object with respect to the second disparity location on the sensor array of the second reflection signal in which the third object may be at a third range from the sensor array that may be greater than the first range and that may be less than the second range. The time-of-flight sensor may further include a third gated TDC circuit that may be configured to generate third timestamp information relating to detection of the third reflection signal in which the third gated TDC circuit may be gated to generate the third timestamp information based on the third disparity location. In yet another embodiment, the third gated TDC circuit may be clocked at a third clock rate that may include a third period that is longer than the first period and shorter than the second period. In still another embodiment, the histogram circuit may generate a histogram that may include bins that correspond to the first and second disparity locations. In one embodiment, an average ambient light level may be subtracted from each bin of the histogram generated by the histogram circuit.

BRIEF DESCRIPTION OF THE DRAWING

In the following section, the aspects of the subject matter disclosed herein will be described with reference to exemplary embodiments illustrated in the figures, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail to not obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not necessarily all be referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system-on-a-chip (SoC), an assembly, and so forth.

The subject matter disclosed herein provides a low-power LiDAR system for mobile and/or automotive devices. Such a LiDAR system may include a transmitter that has laser beams that are pulsed individually or pulsed in groups in a sequential or an interleaving manner. The laser beam shape may controlled to be a line, a circle, an oval, or irregular shape. The LiDAR system may include a receiver that provides disparity-based pixel grouping, and may use a TDC circuit that generates timestamp information representing the time when a return pulse is detected. The TDC may be gated based on the disparity. The TDC frequency may be restricted to improve depth accuracy beyond a bin size limit. The LiDAR system disclosed herein may also use a reduced-bin histogram, and may provide a background cancelled histogram and/or may use on-the-fly peak detection. An advantage provided by the LiDAR system disclosed herein is a better range accuracy across an entire measurement range, while providing a lower power consumption.

The subject matter disclosed herein provides an efficient LiDAR system that reduces optical power by using a reduced number of laser pulses for interrogation while also providing a high spatial resolution. In one embodiment, a semi XY addressable Vertical Cavity Surface Emitting Laser (VCSEL) array may be used for line scanning, regional scanning or flash-illumination scanning. A one-pass high resolution depth measurement is provided by using a gated TDC in combination with a reduced-bin histogram. A TDC frequency (clock) may be selected so that the laser pulse width is a multiple of a TDC period. On-the-fly peak detection may be provided using cross-correlation techniques.

Figure 1:
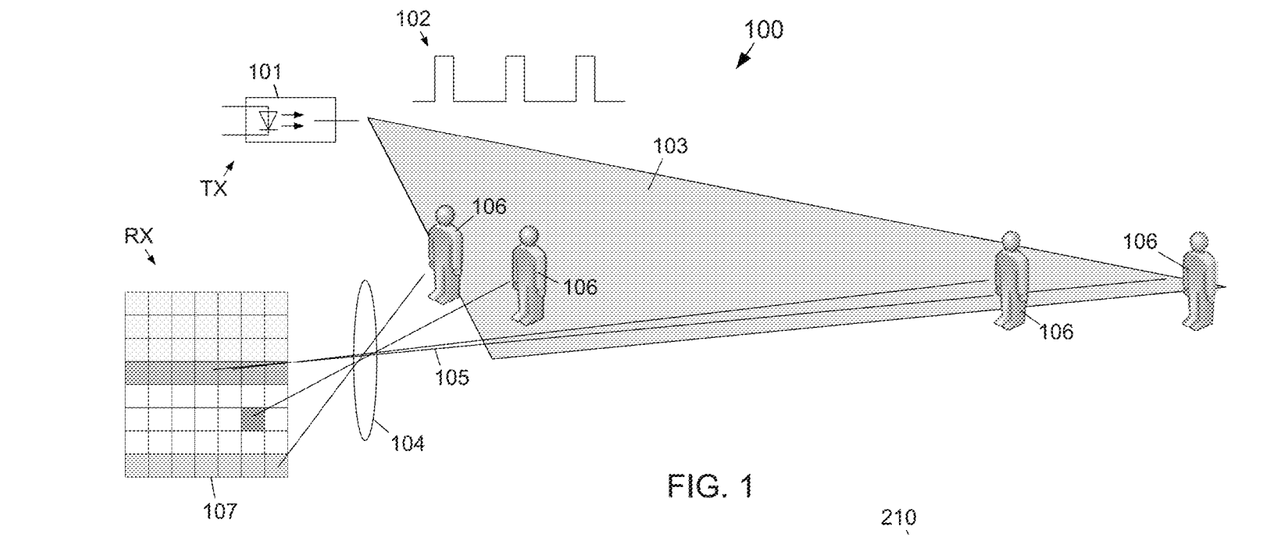
FIG. 1 depicts an operational schematic diagram of an example embodiment of a LiDAR system according to the subject matter disclosed herein.

FIG. 1 depicts an operational schematic diagram of an example embodiment of a LiDAR system 100 according to the subject matter disclosed herein. The LiDAR system 100 may include a transmitter TX and a receiver RX. In one embodiment, the transmitter TX and the receiver RX may formed from one or more modules. The transmitter RX may use a pulsed laser source 101, such as a VCSEL array, that projects one or more beams 103 of laser pulses 102. Each respective beam 103 may be spread, or formed, into one or more sheets (or planes), circles, ovals or other regular or irregular shapes. A beam 103 depicted in FIG. 1 has been formed into a sheet that forms a line in the plane of the sheet. The beams may be operated individually or in groups depending on a field of interest (FOI) determined by the receiver RX. An individual beam or a group of beams may be activated in an interleaving manner to limit peak current on power supply lines.

At the receiver RX, a lens 104 may focus one or more return beams 105 that have been reflected from an object 106 onto one or more image sensors 107 may capture an intensity image and three-dimensional (3D) TOF information. The one or more image sensors 107 may include a two-dimensional (2D) CMOS image sensor, a DTOF sensor that operates in a Time-Correlated Single-Photon Counting) (TCSPC) mode, and/or a hybrid 2D/3D sensor. In one embodiment, the circuitry used for calculating TOF information and for forming a histogram may be on-chip with an image sensor 107. A triangulation technique may be used to limit histogram range, and intensity information may be used to cancel background noise caused by ambient light. A reduced-bin histogram technique may be used to minimize histogram block size. Intensity information around a coarse peak may be used to improve depth accuracy.

TX Pulsed Laser Pattern and FOI Control

Figure 2A:
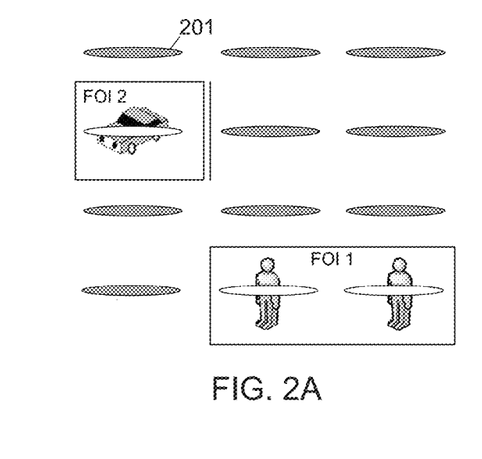
FIG. 2A depicts an example field of view in which example pulsed-laser patterns have been formed into oval shapes according to the subject matter disclosed herein.
Figure 2B:
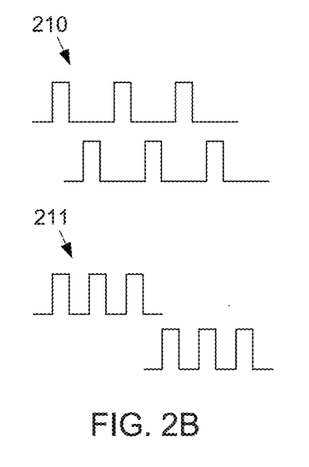
FIG. 2B depicts that laser beams of a LiDAR system may be interleaved or sequential according to the subject matter disclosed herein.

The pulsed laser source 101 may be controlled to form a pulsed-laser pattern that may be an array of beams in the shape of lines or dots that form one or more sheets, circles, ovals or other shapes. The array of beams may be activated individually or in groups. FOIs may be determined by the receiver RX. Machine-learning-based object recognition may be used to determine FOIs. Two example FOIs are depicted in FIG. 2A. A first FOI (FOI 1) includes two people, and a second FOI (FOI 2) includes a vehicle. The pulsed-laser patterns are directly only to FOIs, as indicated by white ovals 201. Darkened ovals 201 in FIG. 2A represent regions determined not to be an FOI. Control of the laser beams may be interleaved 210 or sequential 211, as depicted in FIG. 2B, to limit peak current on power supply lines.

RX Depth Acquisition

Figure 3A:
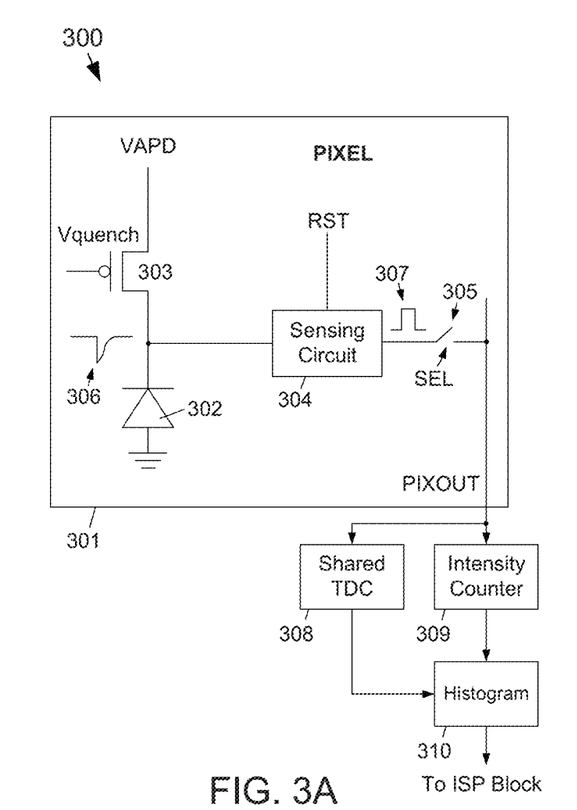
FIG. 3A depicts a first example embodiment of a receiver of a LiDAR system having a shared TDC according to the subject matter disclosed herein.

FIG. 3A depicts a first example embodiment of a receiver 300 of a LiDAR system 100 having a shared TDC according to the subject matter disclosed herein. The receiver 300 may include a pixel 301 that includes a SPAD 302, a quenching device 303, a sensing circuit 304 and a selector switch 305 connected as shown in FIG. 3A. When the SPAD 302 detects an photon, a waveform 306 is generated that is input to the sensing circuit 304. The quenching device 303 operates to recharge the SPAD 302 to a voltage VAPD so that the SPAD 302 may be ready to be triggered by another photon. In response to the waveform 306, the sensing circuit 304 outputs a digital pulse waveform 307. The pulse width of the waveform 307 may or may not be controllable by the sensing circuit 304. A reset RST signal is input to the sensing circuit 304 to enable the sensing circuit to respond to another waveform 306.

The selector switch 305 may be controlled by a SEL signal to allow the waveform 307 to be output from the pixel 301 as a PIXOUT output signal line that may be shared with other pixels (not shown). That is, the first example embodiment of a receiver 300 of the LiDAR system 100 may include an array of pixels in which the respective output waveforms 307 are input to shared TDC circuits and shared intensity (photon) counter circuits.

FIG. 3A shows that a shared TDC circuit 308 and an intensity (photon) counter circuit 309 may be coupled to the PIXOUT output. Outputs from both the TDC circuit 308 and the intensity counter circuit 309 are input to a histogram circuit 310. An output from the intensity counter circuit 309 and from the histogram circuit 310 are coupled to an ISP block (not shown) to find a location of a peak and convert the TDC output to TOF information. The output of the intensity counter circuit 309 may reflect intensity information of the pixel 301 and may be used by the histogram circuit 310 and/or the ISP block for background cancellation purposes. Each of the shared TDC circuit 308, the intensity counter 309 and the histogram circuit 310 may be embodied as modules.

Figure 3B:
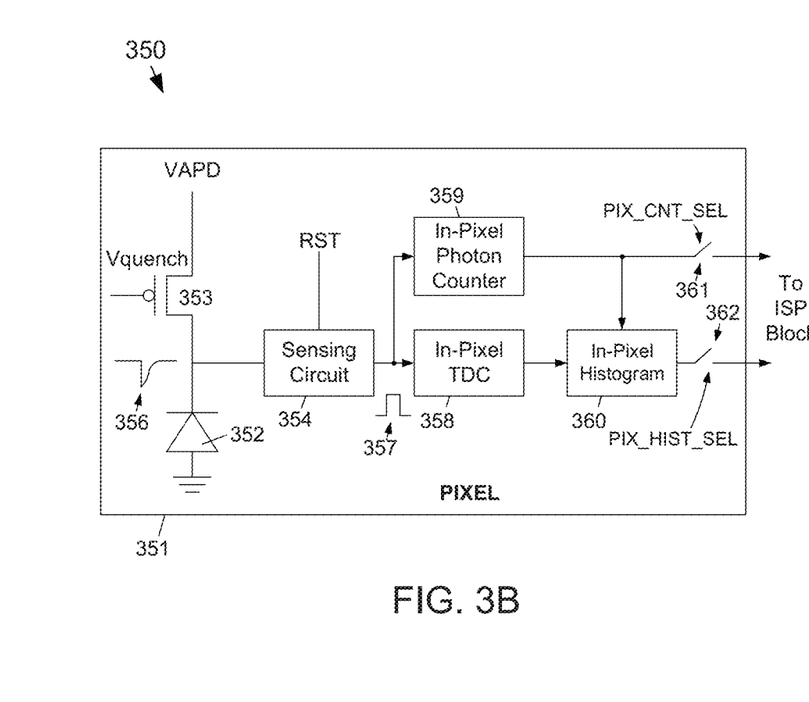
FIG. 3B depicts a second example embodiment of a receiver of a LiDAR system having in-pixel TDC according to the subject matter disclosed herein.

FIG. 3B depicts a second example embodiment of a receiver 350 of a LiDAR system 100 having an in-pixel TDC circuit, an intensity counter circuit, a histogram circuit and two selector switches according to the subject matter disclosed herein. The receiver 350 may include a pixel 351 that includes a SPAD 352, a quenching device 353 and a sensing circuit 354 connected as shown in FIG. 3B. When the SPAD 352 detects an photon, a waveform 356 is generated that is input to the sensing circuit 354. The quenching device 353 operates to recharge the SPAD 352 to a VAPD voltage so that the SPAD 352 may be ready to be triggered by another photon. In response to the waveform 356, the sensing circuit 354 outputs a digital pulse waveform 357. The pulse width of the waveform 357 may or may not be controllable by the sensing circuit 354. A reset RST is input to the sensing circuit 354 to enable the sensing circuit to respond to another waveform 356.

The waveform 307 is input to an in-pixel TDC circuit 358 and an in-pixel intensity (photon) counter circuit 359. That is, the TDC circuit 358 and the intensity counter circuit 359 are not shared with other pixels. Outputs from both the TDC circuit 358 and the intensity counter circuit 359 are input to an in-pixel histogram circuit 360. An output signal from the intensity counter circuit 359 passes through a first selector switch 361, which is controlled by a PIX_CNT_SEL signal to couple the output signal to an ISP block (not shown). An output signal from the histogram circuit 360 passes through a second selector switch 362, which is controlled by a PIX_HIST_SEL signal to couple the output signal to the ISP block (not shown). The output signals from the intensity counter circuit 350 and the histogram circuit 360 may be used by the ISP block to find a location of a peak and convert the TDC output to TOF information.

Similar to the intensity counter circuit 309 in FIG. 3A, the output of the intensity counter circuit 359 may reflect intensity information of the pixel 351 and may be used by the histogram circuit 360 and/or the ISP block for background cancellation purposes. Each of the in-pixel TDC circuit 358, the in-pixel intensity counter 358 and the in-pixel histogram circuit 360 may be fabricated as part of the pixel 351.

Figure 4:
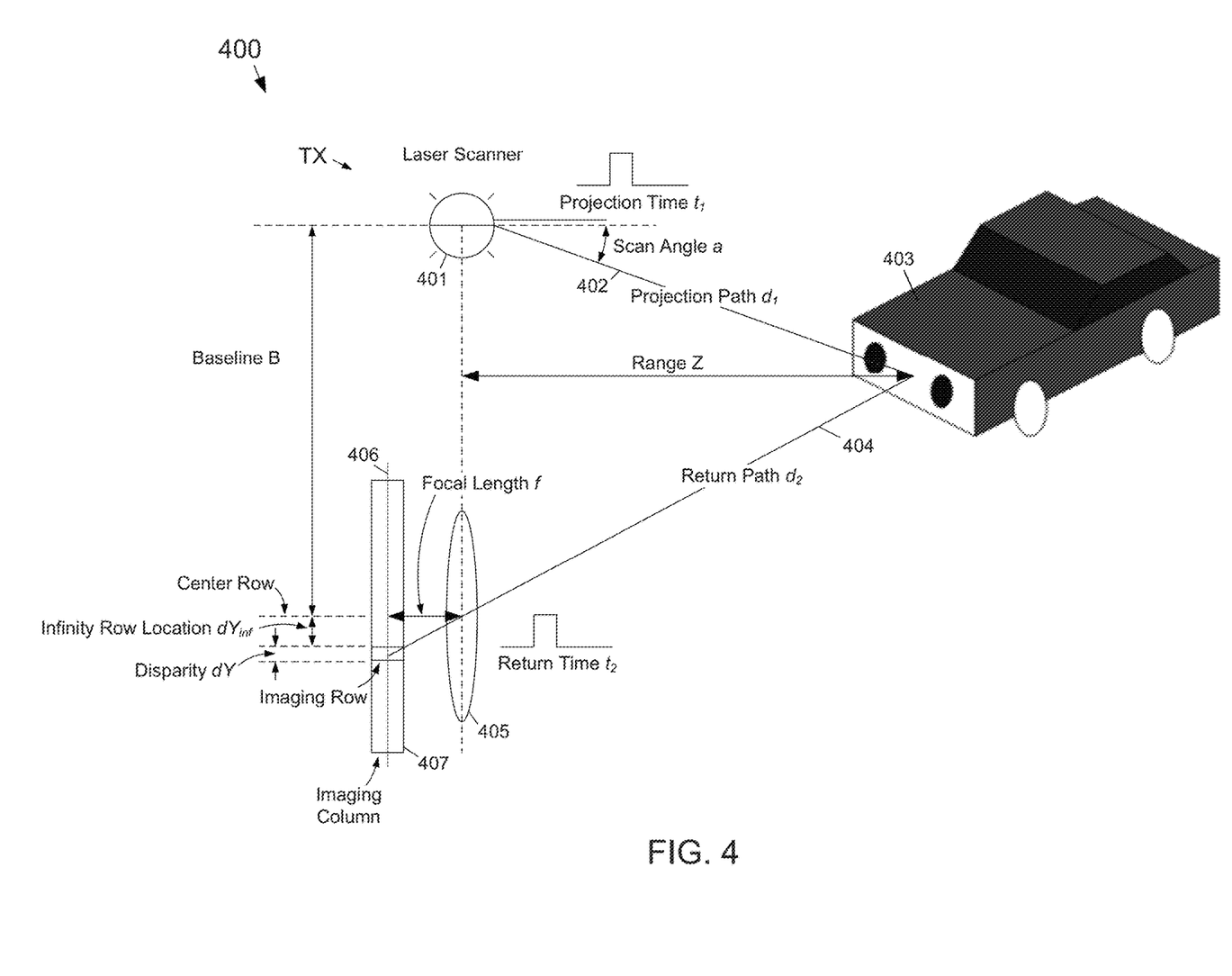
FIG. 4 depicts an example configuration of a LiDAR system according to the subject matter disclosed herein.

FIG. 4 depicts an example configuration 400 of the LiDAR system 100 according to the subject matter disclosed herein. In the configuration 400, a transmitter TX is located above a receiver RX in the y-axis direction. A laser scanner 401 of the transmitter TX transmits one or more pulsed-laser patterns, such as a sheet, a circle, an oval or another shape, that may be form from an array of beams in the shape of lines or dots. Each respective beam 402 transmitted from the laser scanner transmitter 401 along a projection path $d_1$ having a fixed scan angle a with respect to the system 100. When a beam 402 is projected onto an object 403, a reflection beam 404 returns to the receiver RX along a return path $d_2$ and is focused by one or more lenses 405 having a focal length f onto an image plane 406 of an image sensor 407 of the receiver RX.

When a beam 402 is projected onto an object 403 that is far away, the location of the return beam 404 on the image plane 406 is fixed. For example, for the example transmitter TX and receiver RX, a location of a far-field image of a return beam is at a row (denoted the "infinity row") of the image sensor that is a $dY_{inf}$ distance from an image center row of the image sensor 407. If an object is closer to the camera (LiDAR system 100), there will be a disparity distance of dY from $dY_{inf}$.

The range Z of the object 403 from the LiDAR system 100 may be determined using the following triangulation equation.

$$Z = \frac{fB}{dY_{inf} + dY + f\tan(a)} \quad (1)$$

in which f is the focal length of the one or more lenses 405, B is the baseline length between the laser scanner 401 and the center row of the image sensor 407, $dY_{inf}$ is the distance between the center row of the image sensor 407 to the infinity row, dY is the disparity distance, and a is the angle of the projection path $d_1$ with respect to the system 100.

The time of flight of the laser pulses may be determined directly from the following equation.

$$Z = \frac{d_1 + d_2}{2} = \frac{c \times (t_1 + t_2)}{2} \quad (2)$$

in which $d_1$ is the distance of the projection path, $d_2$ is the distance of the return path, c is the speed of light, $t_1$ is the time of flight over the projection path to an object, and $d_2$ is the time of flight over the return path from the object.

Figures 5, 6:
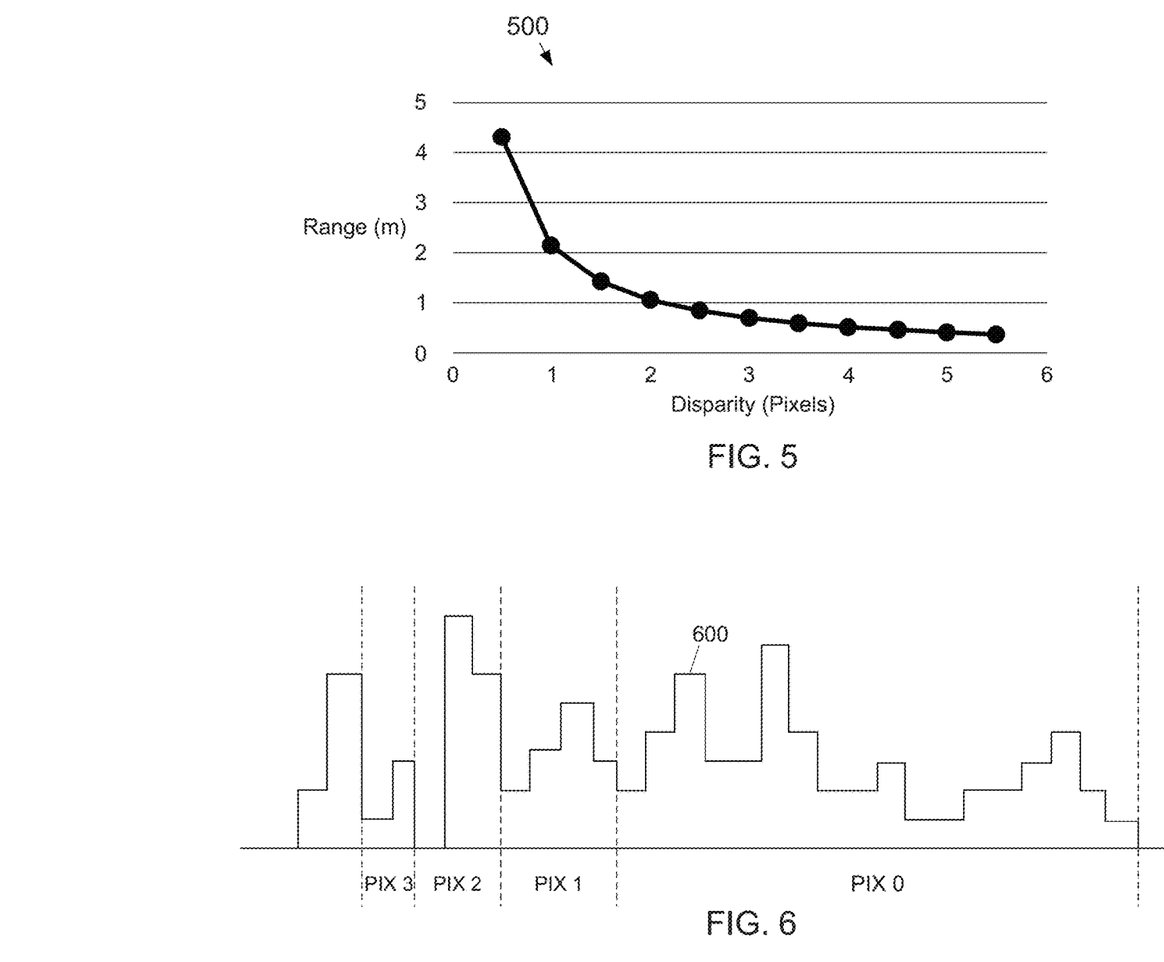
FIG. 5 shows an example graph of Range vs. Disparity for an example LiDAR system according to the subject matter disclosed herein.
FIG. 6 shows an example histogram for four pixels according to the subject matter disclosed herein.

FIG. 5 shows an example graph 500 of Range vs. Disparity for the example LiDAR system 100 according to the subject matter disclosed herein. Disparity in pixels is shown along the abscissa and range in meters is shown along the ordinate. In the graph of FIG. 5, an object having a range greater than about 4.2 m has no disparity. If an object has a range of between about 1.2 m and about 4.2 m, the object has a disparity of one (1) pixel. As the range of an object gets closer to the LiDAR system, the disparity becomes greater. An object at a range of less than 1 m may have a disparity of between 2 and 6 pixels. In view of the range to disparity characteristics, a gated window may be used for each pixel to capture reflected laser pulses. Alternatively, the same gated window may be used for pixels that are grouped.

FIG. 6 shows an example histogram 600 for four pixels according to the subject matter disclosed herein. An example full histogram 601 is depicted that corresponds to the range and disparity characteristics of FIG. 5. PIX 0 is a histogram bin for an object having a range greater than about 4.2 m (i.e., a range having no disparity). PIX 1 is a histogram bin for an object having a range of between about 1.2 m and about 4.2 m. PIX 2 is a histogram bin for an object having a range of between about 1.2 m and about 0.8 m. PIX 3 is a histogram bin for an object having a range of between about 0.7 m and 0.5 m.

RX On-Chip TDC with Gated Window

Figure 7:
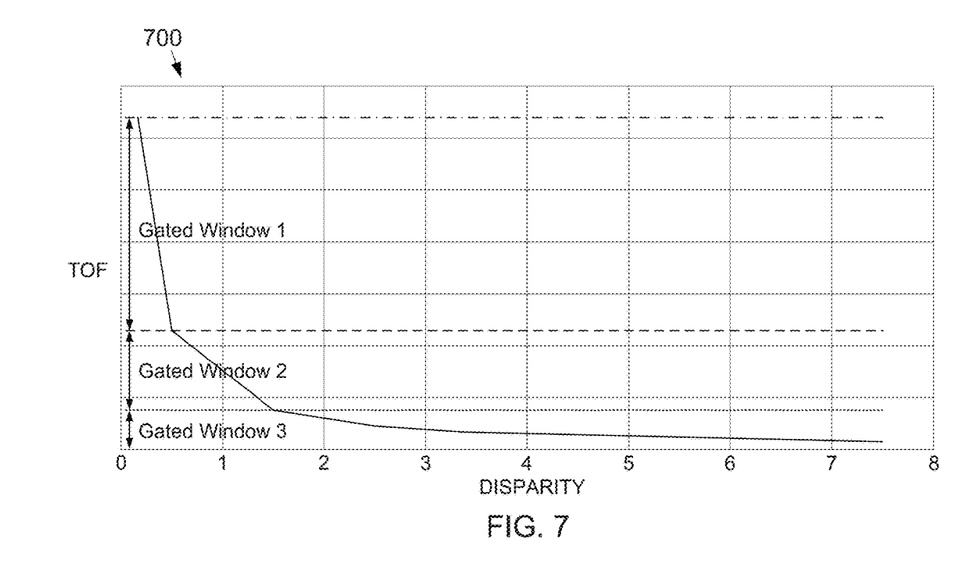
FIG. 7 shows a first example graph of TOF vs. Disparity according to the subject matter disclosed herein.

FIG. 7 shows a first example graph 700 of TOF vs. Disparity according to the subject matter disclosed herein. The graph 700 corresponds to the characteristics shown in FIG. 5. Multiple gated windows for TDC operations may be defined based on disparity. One pixel or a group of pixels may share the same gated window. For example, gated window 1 may correspond to a disparity of PIX 0 of FIG. 6. Gated window 2 may correspond to a disparity of PIX 1 of FIG. 6, and gated window 3 may correspond to a disparity of PIX 2 of FIG. 6. (A gated window for a disparity of PIX 3 is not shown in graph 700.) Pixels that belong to the same group with the same gated window may share the same TDC circuit. Different gated windows may have different TDC resolutions by using correspondingly different TDC clocks. Gated windows may have overlap between other gated windows, and each pixel may have its own in-pixel TDC circuit.

Figure 8:
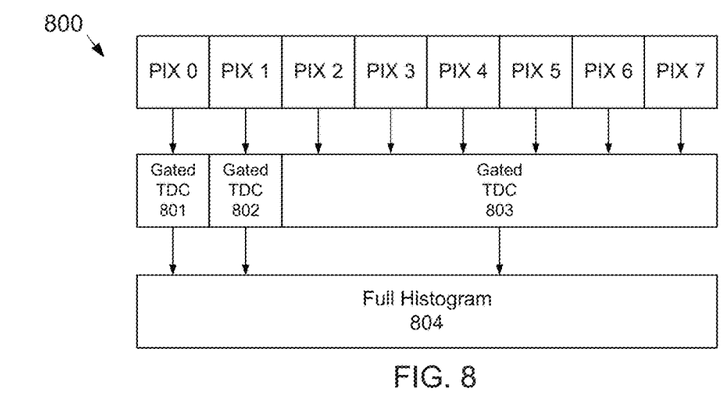
FIG. 8 depicts an example configuration of pixels of an image sensor, gated TDCs and a full histogram circuit corresponding to the graph of FIG. 6 according to the subject matter disclosed herein.

FIG. 8 depicts an example configuration 800 of pixels of an image sensor, gated TDCs and a full histogram circuit corresponding to the graph of FIG. 6 according to the subject matter disclosed herein. In FIG. 8, PIX 0 coupled to gated TDC 801. PIX 1 is coupled to gated TDC 802 and PIX 2-PIX 7 are coupled to gated TDC 803. The outputs of gated TDC 1-TDC 3 are coupled to a full histogram circuit 804.

RX Reduced-Bin Variable Precision Histogram

Figure 9:
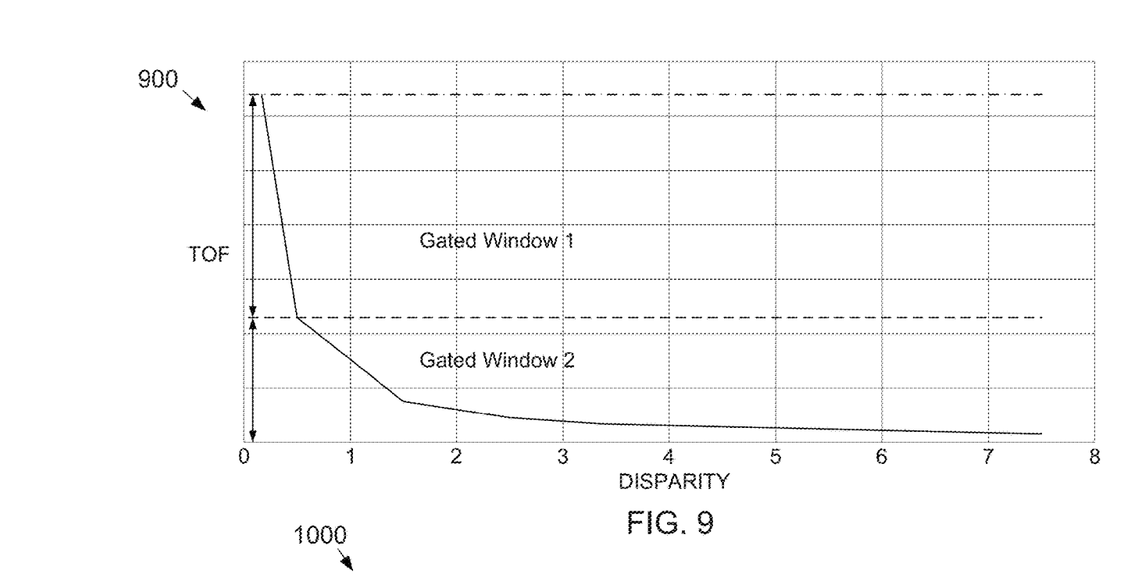
FIG. 9 shows a second example graph of TOF vs. Disparity according to the subject matter disclosed herein.

Pixels may be grouped by TOF range and different TDC gating windows may be used for the different groups. The different TDCs may be configured to have depth precisions. For example, a shorter range may have a finer resolution with faster clock and a longer range may have coarser resolution with slower clock. FIG. 9 shows a second example graph 900 of TOF vs. Disparity according to the subject matter disclosed herein. The graph 900 corresponds to the characteristics shown in FIG. 5. The graph 900 may be used to form a bin-reduced histogram having a uniform bin size and fewer number of bins than a full histogram.

Figure 10:
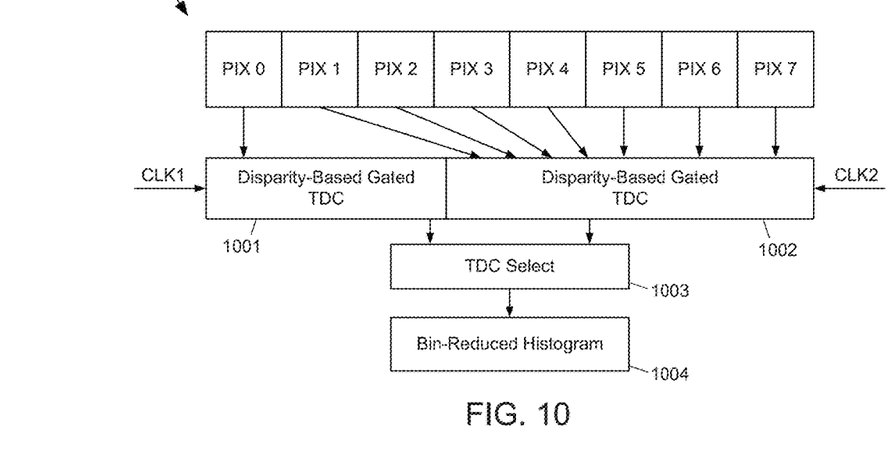
FIG. 10 depicts an example TOF system configuration according to the subject matter disclosed herein.

FIG. 10 depicts an example TOF system configuration 1000 according to the subject matter disclosed herein. The TOF system configuration 1000 operates based on the graph of FIG. 9. In FIG. 10, PIX 0 is coupled to a disparity-based gated TDC 1001. A first clock signal CLK1 is input to the disparity-based gated TDC 1001. PIX 1-PIX 7 are coupled to a disparity-based gated TDC 1002. A second clock signal CLK2 is input to the disparity-based gated TDC 1002. The first clock signal CLK1 may have a first period that has been selected to correspond to a range resolution associated with PIX 0. Similarly, the second clock signal CLK2 may have a second clock period that has been selected to correspond to a range resolution associated with PIX 1-PIX 7. For example, the first clock signal CLK1 may have a period of 2 ns, which provides a resolution of about 30 cm, and the second clock signal CLK2 may have a period of 0.25 ns, which provides a resolution of about 5 cm. The outputs of the disparity-gated TDCs 1001 and 1002 are input to a TDC select circuit 1003. The TDC select circuit 1003 may be controlled to select between the outputs of the disparity-gated TDC 1001 and 1002, which is passed to a bin-reduced histogram circuit 1004. Although the example system 1000 of FIG. 10 depicts only two disparity-based gated TDCs, it should be understood that the example system 1000 could be configured to have more than two disparity-based gated TDCs.

Figure 11:
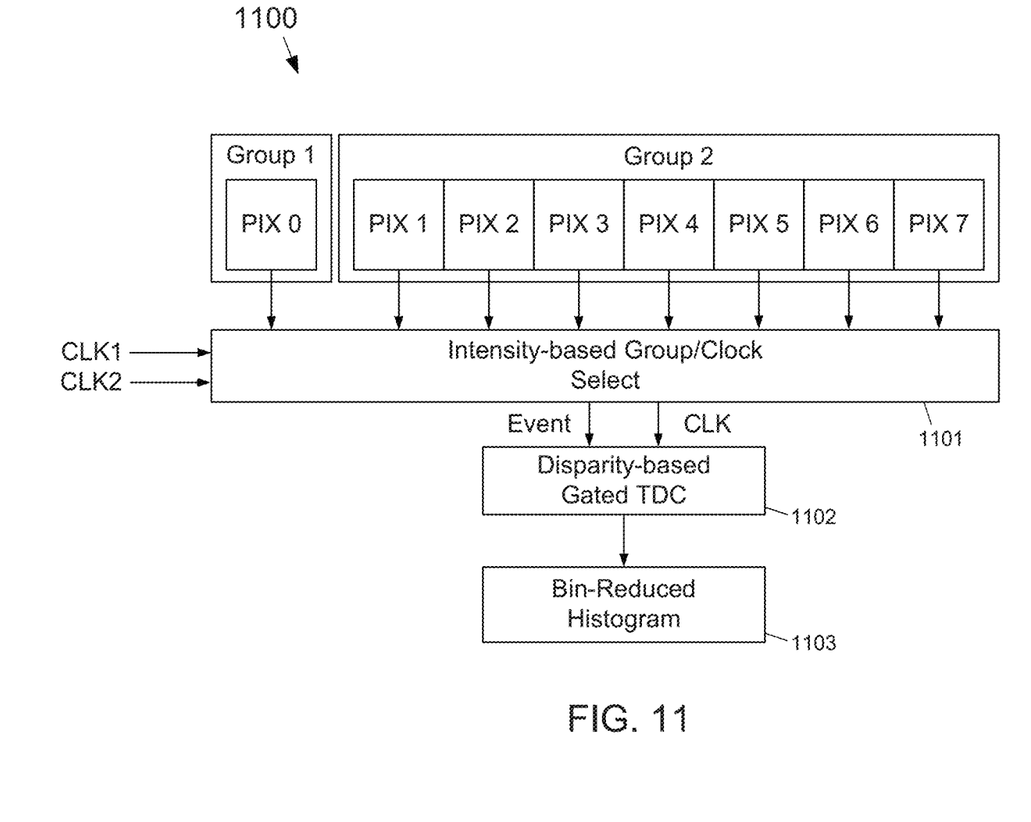
FIG. 11 depicts another example TOF system configuration according to the subject matter disclosed herein.

FIG. 11 depicts an example TOF system configuration 1100 according to the subject matter disclosed herein. The TOF system configuration 1100 operates based on the graph of FIG. 9. In FIG. 11, PIX 0-PIX 7 are coupled to an intensity-based group/clock select circuit 1101. A first clock signal CLK1 and a second clock signal CLK2 are also input to the intensity-based group/clock select circuit 1101. The first clock signal CLK1 may have a first period that has been selected to correspond to a range resolution associated with PIX 0. Similarly, the second clock signal CLK2 may have a second clock period that has been selected to correspond to a range resolution associated with PIX 1-PIX 7. For example, the first clock signal CLK1 may have a period of 2 ns, which provides a resolution of about 30 cm. The second clock signal CLK2 may have a period of 0.25 ns, which provides a resolution of about 5 cm. The intensity-based group/clock select circuit 1101 selects a pixel group and corresponding clock signal based on an intensity level detected by the respective pixel groups. Based on the selection, an Event signal and the corresponding clock signal are output to a disparity-based gated TDC circuit 1102. An output of the disparity-based TDC circuit 1102 is input to a bin-reduced histogram circuit 1103. Although the example system 1100 of FIG. 11 depicts only two groups of pixels and two clock signals, it should be understood that the example system 1100 could be configured to have more than two groups of pixels and two clock signals.

RX Ambient Light Caused Background Noise Cancellation

A pixel in FOI may be operated in a photon-counting mode with no laser pulses being transmitted to measure an ambient light level. The same gated windows and the measurement period may be used as when laser pulses are transmitted (activated). The total number of photons triggering a pixel within the gated window of all cycles may be counted, and an average photon count $P_{BIN\_AVE}$ may be determined for each histogram bin within the gated window. The laser may then be activated for a range measurement.

The corresponding average $P_{BIN\_AVE}$ may be subtracted from each respective bin prior to, during or after the histogram is formed. At the end of the laser activation cycles, the background (ambient) noise has been cancelled from the measurement and histogram bins having positive counts may be considered for the most likely peak detections.

RX On-The-Fly Histogram Peak Detection with Cross-Correlation

Figure 12:
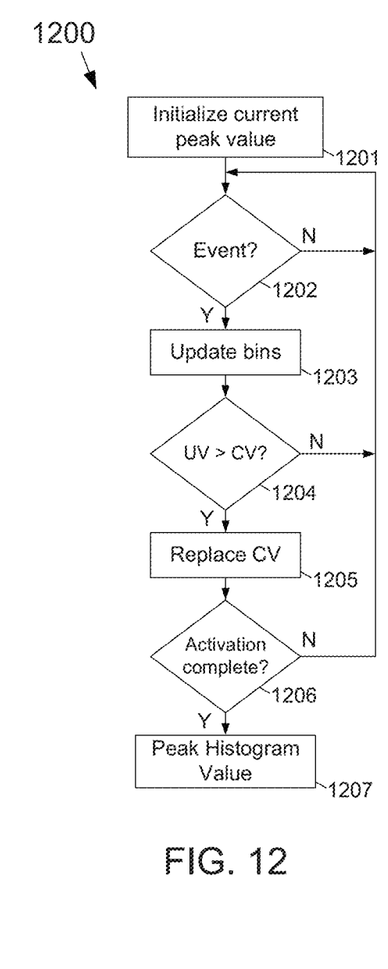
FIG. 12 is a flow diagram of an "on the fly" histogram peak-determination technique according to the subject matter disclosed herein.
Figure 13:
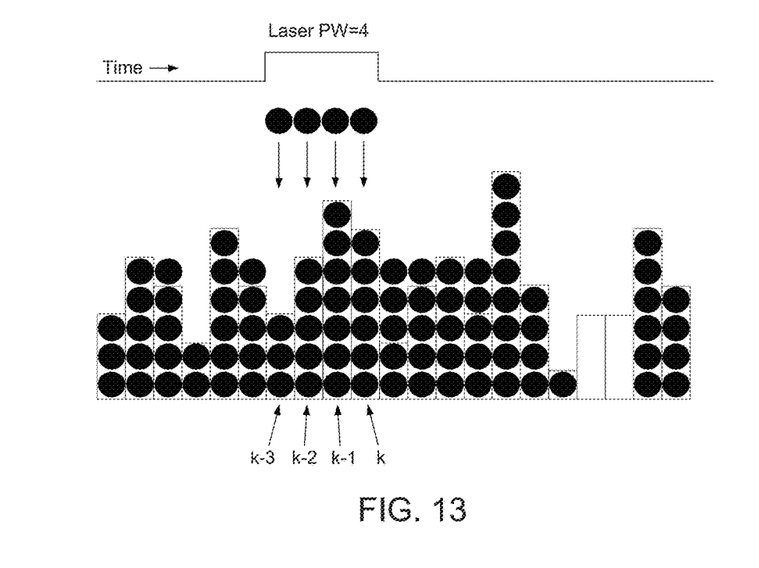
FIG. 13 depicts an example "on-the-fly" histogram peak-determination technique according to the subject matter disclosed herein.

FIG. 12 is a flow diagram 1200 of an "on the fly" histogram peak-determination technique according to the subject matter disclosed herein. FIG. 13 depicts an example "on-the-fly" histogram peak-determination technique according to the subject matter disclosed herein. Consider an example in which the laser pulse width (PW) equals N. At 1201, a current peak value is set to 0. At 1202, it is determined whether a photon detection event has occurred. If not, flow returns to 1202. If, at 1202, a photon detection event has occurred having a TDC output of k, flow continues to 1203 where one event count is added to N consecutive histogram bins neighboring bin k in bins either preceding or subsequent to the bin k to effectively apply a cross-correlation function to the detected events. For example, for a TDC output of k, one event count is added to bins k−(N+1) to k, or from k to k+(N−1). Bin k should be included. In FIG. 13, an example laser PW of 4 is shown for a TDC output to bin k. One event count (represented by a circle) is added to bins k−3, k−2 and k−1 (which precede bin k in time), and to bin k.

Flow continues to 1204 wherein it is determined whether a value for an updated bin (an Updated Value (UV)) is greater than the current peak value (Current Value (CV)). If not, flow returns to 1202. If so, flow continues to 1205 where the current peak value is replaced with the updated value. Two memory cells (i.e., registers) may be allocated to store a current peak value and the corresponding bin location.

Flow continues to 1206 where it is determined whether an accumulation period for capturing laser pulses is complete. If not, flow returns to 1202. If so, flow continues to 1207 where the peak histogram value and the corresponding bin location are available in the two registers.

Figure 14:
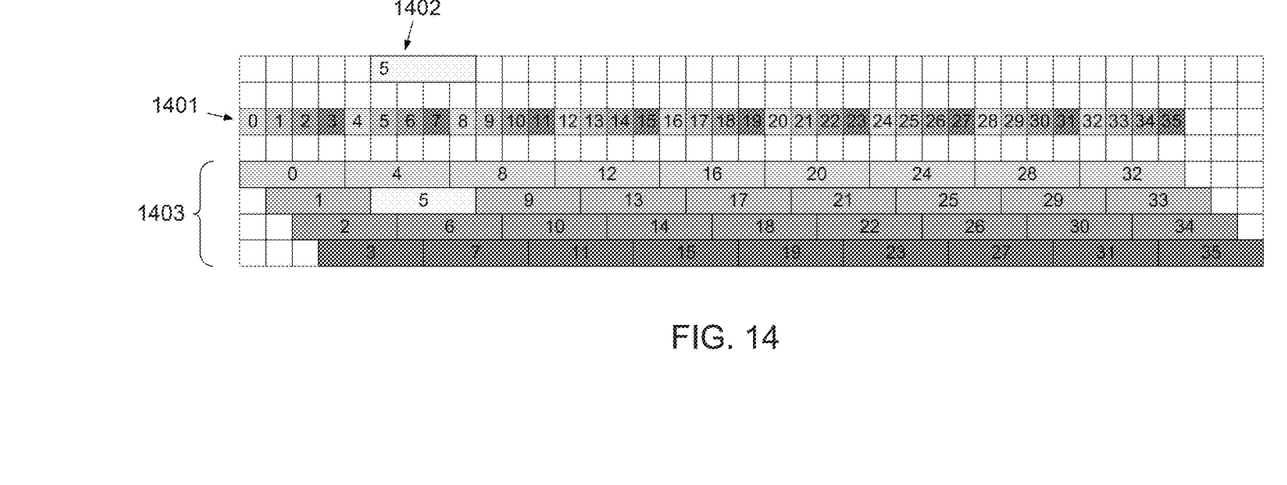
FIG. 14 depicts an example in which event counts are updated to bins that are subsequent to a detection event bin according to the subject matter disclosed herein.

FIG. 14 depicts an example in which event counts are updated to bins that are subsequent to a detection event bin according to the subject matter disclosed herein. In FIG. 14, there are 36 event bins 1401 and the laser PW is 4. For a detected event having a TDC value of 5, a corresponding cross-correlation bin block is shown at 1402. Cross-correlation bin blocks are shown at 1403 for each of the 36 event bins.

Figure 15:
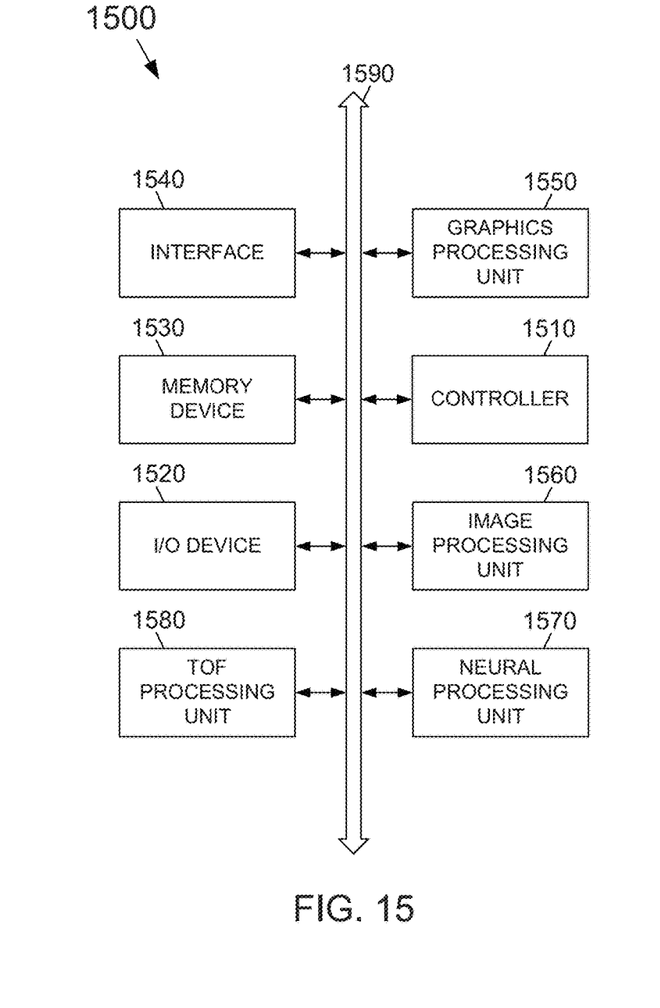
FIG. 15 depicts an electronic device that includes a TOF LiDAR system according to the subject matter disclosed herein.

FIG. 15 depicts an electronic device 1500 that includes a TOF LiDAR system according to the subject matter disclosed herein. The electronic device 1500 may include a controller (or CPU) 1510, an input/output device 1520 such as, but not limited to, a keypad, a keyboard, a display, a touch-screen display, a camera, and/or an image sensor, a memory 1530, an interface 1540, a GPU 1550, an imaging-processing unit 1560, a neural processing unit 1570, a TOF processing unit 1580 that are coupled to each other through a bus 1590. The controller 1510 may include, for example, at least one microprocessor, at least one digital signal processor, at least one microcontroller, or the like. The memory 1530 may be configured to store a command code to be used by the controller 1510 or a user data. The TOF processing unit 1580 may be configured based on one or more of the example embodiments described in connection with FIGS. 1-14 herein.

Electronic device 1500 and the various system components of electronic device 1500 may be formed from one or modules. The interface 1540 may be configured to include a wireless interface that is configured to transmit data to or receive data from a wireless communication network using a RF signal. The wireless interface 1540 may include, for example, an antenna. The electronic system 1500 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), Sixth-Generation Wireless (6G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of data-processing apparatus. Alternatively or additionally, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A time-of-flight sensor, comprising:
a sensor array comprising a plurality of pixels arranged to detect a first disparity location on the sensor array of a first reflection signal received from a first object with respect to a second disparity location on the sensor array of a second reflection signal received from a second object, the first object being at a first range from the sensor array, the second object being at a second range from the sensor array, and the second range being greater than the first range;
a first gated time-to-digital converter (TDC) circuit configured to generate first timestamp information relating to detection of the first reflection signal, the first gated TDC circuit being gated to generate the first timestamp information based on the first disparity location; and
a second gated TDC circuit configured to generate second timestamp information relating to detection of the second reflection signal, the second gated TDC circuit being gated to generate the second timestamp information based on the second disparity location, wherein:
the first gated TDC circuit is clocked at a first clock rate comprising a first period,
the second gated TDC circuit is clocked at a second clock rate comprising a second period different from the first period, and
a clock frequency of the first gated TDC circuit is selected to cause a pulse width of a transmitted pulse to be a multiple of the first period.

2. The time-of-flight sensor of claim 1, wherein the first period is shorter than the second period.

3. The time-of-flight sensor of claim 1, wherein the plurality of pixels of the sensor array are further arranged to detect a third disparity location on the sensor array of a third reflection signal received from a third object with respect to the second disparity location on the sensor array of the second reflection signal, the third object being at a third range from the sensor array that is greater than the first range and that is less than the second range, the time-of-flight sensor further comprising a third gated TDC circuit configured to generate third timestamp information relating to detection of the third reflection signal, the third gated TDC circuit being gated to generate the third timestamp information based on the third disparity location.

4. The time-of-flight sensor of claim 3, wherein the third gated TDC circuit is clocked at a third clock rate comprising a third period that is longer than the first period and shorter than the second period.

5. The time-of-flight sensor of claim 1, further comprising a histogram circuit that generates a histogram comprising bins that correspond to the first and second disparity locations.

6. The time-of-flight sensor of claim 1, further comprising a histogram circuit in which an average ambient light level is subtracted from each bin of a histogram generated by the histogram circuit.

7. The time-of-flight sensor of claim 1, further comprising a histogram circuit coupled to the first TDC circuit and the second TDC circuit, wherein the histogram circuit generates a histogram based on first and second timestamp information in which a detection event is added to a number of bins that correspond to the pulse width of the transmitted pulse that is detected as a reflection signal by the sensor array.

8. A time-of-flight sensor, comprising:

a sensor array comprising a first group of pixels that detect a first disparity location on the sensor array of a first reflection signal received from a first object and a second group of pixels that detect a second disparity location on the sensor array of a second reflection signal received from a second object, the first object being at a first range from the sensor array, and the second object being at a second range from the sensor array that is greater than the first range;

a selector circuit coupled to the sensor array, the selector circuit outputting a first output of the first group of pixels and a first clock signal corresponding to the first disparity location based on an intensity of the first group of pixels being greater than an intensity of the second group of pixels, and outputting a second output of the second group of pixels and a second clock signal corresponding to the second disparity location based on the intensity of the second group of pixels being greater than the intensity of the second group of pixels; and a gated time-to-digital converter (TDC) circuit coupled to the output of the selector circuit, the gated TDC circuit being configured to generate first timestamp information for the first output of the first group of pixels using the first clock signal based on the selector circuit outputting the first output of the first group of pixels and the first clock signal, and being configured to generate second timestamp information for the second output of the second group of pixels using the second clock signal based on the selector circuit outputting the second output of the second group of pixels and the second clock signal, wherein:

the first clock signal comprises a first clock period, and a clock frequency of the gated TDC circuit is selected to cause a pulse width of a transmitted pulse to be a multiple of the first clock period.

9. The time-of-flight sensor of claim 8, wherein the second clock signal comprises a second clock period that is longer than the first clock period.

10. The time-of-flight sensor of claim 9, wherein the sensor array further comprises a third group of pixels that detect a third disparity location on the sensor array of a third reflection signal received from a third object, the third object being at a third range from the sensor array that is greater than the first range and less than the second range, wherein the selector circuit further outputting a third output of the third group of pixels and a third clock signal corresponding to the third disparity location based on an intensity of the third group of pixels being greater than the intensity of the first group of pixels and the intensity of the second group of pixels, and wherein the gated TDC circuit is further configured to generate timestamp information for the third output of the third group of pixels using the third clock signal based on the selector circuit outputting the third output of the third group of pixels and the third clock signal.

11. The time-of-flight sensor of claim 10, wherein the third clock signal comprises a third clock period that is longer than the first clock period and shorter than the second clock period.

12. The time-of-flight sensor of claim 8, further comprising a histogram circuit that generates a histogram comprising bins that correspond to the first and second disparity locations.

13. The time-of-flight sensor of claim 8, further comprising a histogram circuit in which an average ambient light level is subtracted from each bin of a histogram generated by the histogram circuit.

14. The time-of-flight sensor of claim 8, further comprising a histogram circuit coupled to the gated TDC circuit, the histogram circuit generating a histogram based on first and second timestamp information and in which a detection event is added to a number of bins that correspond to a pulse width of a transmitted pulse that is detected as a reflection signal by the sensor array.

15. A time-of-flight sensor, comprising:

a sensor array comprising a plurality of pixels arranged to detect a first disparity location on the sensor array of a first reflection signal received from a first object with respect to a second disparity location on the sensor array of a second reflection signal received from a second object, the first object being at a first range from the sensor array, the second object being at a second range from the sensor array, and the second range being greater than the first range;

a first gated time-to-digital converter (TDC) circuit configured to generate first timestamp information relating to detection of the first reflection signal, the first gated TDC circuit being gated to generate the first timestamp information based on the first disparity location;

a second gated TDC circuit configured to generate second timestamp information relating to detection of the second reflection signal, the second gated TDC circuit being gated to generate the second timestamp information based on the second disparity location; and a histogram circuit coupled to the first TDC circuit and the second TDC circuit, the histogram circuit generating a histogram based on first and second timestamp information and in which a detection event is added to a number of bins that correspond to a pulse width of a transmitted pulse that is detected as a reflection signal by the sensor array, wherein:

the first gated TDC circuit is clocked at a first clock rate comprising a first period, the second gated TDC circuit is clocked at a second clock rate comprising a second period different from the first period, and a clock frequency of the first gated TDC circuit is selected to cause the pulse width of the transmitted pulse to be a multiple of the first period.

16. The time-of-flight sensor of claim 15, wherein the first period is shorter than the second period.

17. The time-of-flight sensor of claim 15, wherein the plurality of pixels of the sensor array are further arranged to detect a third disparity location on the sensor array of a third reflection signal received from a third object with respect to the second disparity location on the sensor array of the second reflection signal, the third object being at a third range from the sensor array that is greater than the first range and that is less than the second range, the time-of-flight sensor further comprising a third gated TDC circuit configured to generate third timestamp information relating to detection of the third reflection signal, the third gated TDC circuit being gated to generate the third timestamp information based on the third disparity location.

18. The time-of-flight sensor of claim 17, wherein the third gated TDC circuit is clocked at a third clock rate comprising a third period that is longer than the first period and shorter than the second period.

19. The time-of-flight sensor of claim 15, wherein the histogram circuit generates a histogram comprising bins that correspond to the first and second disparity locations.

20. The time-of-flight sensor of claim 15, wherein an average ambient light level is subtracted from each bin of the histogram generated by the histogram circuit.

* * * * *